US006574485B1

(12) United States Patent
Salonaho et al.

(10) Patent No.: US 6,574,485 B1
(45) Date of Patent: Jun. 3, 2003

(54) POWER CONTROL IN A RADIO SYSTEM

(75) Inventors: Oscar Salonaho, Helsinki (FI); Oscar Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/580,753

(22) Filed: May 30, 2000

Related U.S. Application Data

(63) Continuation of application No. PCT/FI99/00763, filed on Sep. 16, 1999.

(30) Foreign Application Priority Data

Sep. 30, 1998 (FI) .................................................. 982121

(51) Int. Cl.[7] .............................. H04B 7/00; H04Q 7/20
(52) U.S. Cl. ............................................ 455/522; 455/69
(58) Field of Search .......................... 455/522, 450–453, 455/455, 464, 69, 63

(56) References Cited

U.S. PATENT DOCUMENTS

| | | | | |
|---|---|---|---|---|
| 5,241,690 A | * | 8/1993 | Larsson et al. ............ 455/54.1 |
| 5,287,544 A | * | 2/1994 | Menich et al. ............. 455/33.1 |
| 5,345,448 A | | 9/1994 | Keskitalo .................... 370/95.3 |
| 5,396,516 A | | 3/1995 | Padovani et al. ........... 375/225 |
| 5,506,837 A | | 4/1996 | Sollner et al. ................. 370/31 |
| 5,564,080 A | * | 10/1996 | Eul et al. ....................... 455/69 |
| 5,603,093 A | | 2/1997 | Yoshimi et al. ............... 455/63 |
| 5,673,259 A | * | 9/1997 | Quick, Jr. .................... 370/342 |
| 5,678,208 A | | 10/1997 | Kowalewski et al. ........ 455/115 |
| 5,689,801 A | | 11/1997 | Frichtel et al. ................. 455/9 |
| 5,703,873 A | * | 12/1997 | Ojanpera et al. ............ 370/332 |
| 6,072,990 A | * | 6/2000 | Argrawal et al. .............. 455/69 |
| 6,131,015 A | * | 10/2000 | Hill et al. ...................... 455/69 |
| 6,175,745 B1 | * | 1/2001 | Bringby et al. .............. 455/522 |
| 6,223,056 B1 | * | 4/2001 | Appel ........................... 455/561 |

FOREIGN PATENT DOCUMENTS

| | | | |
|---|---|---|---|
| WO | 98/52375 | 11/1998 | ................. 455/436 |
| WO | 98/54853 | 12/1998 | ................. 455/93 |

OTHER PUBLICATIONS

Feb. 2000, International Search Report for PCT/FI99/00763.
1992, "Distributed Cochannel Interference Control in Cellular Radio Systems" Zander; IEEE Transactions on Vehicular Technology, vol. 41, No. 3, Aug. 1992.
1999, "The Convergence of an Asynchronous Cooperative Alogorithm for Distributed Power Control in Cellular Systems" Sung, et al. IEEE Transactions on Vehicular Technology, vol. 48, No. 2, Mar. 1999.
1992, "The GSM System for Mobile Communications" Mouly, et al.

* cited by examiner

*Primary Examiner*—Daniel Hunter
*Assistant Examiner*—Tuan Tran
(74) *Attorney, Agent, or Firm*—Squire, Sanders & Dempsey, LLP

(57) ABSTRACT

The invention concerns a method of power regulation in a radio system including at least two transmitters, e.g. base transceiver stations, transmitting at the same frequency and receivers, e.g. mobile stations, which have set up a radio communication with the former. In the method according to the invention, the results of measurements of co-channel adjacent transmitter signals are used, besides the results of measurements of the radio communication to be relayed, in making the power regulation decision. From the results of measurements of adjacent transmitter signals to be transmitted with the monitored radio communication at the same frequency and in the same time slot, an estimate is determined of that interference caused to the radio communication, which is to be compensated for by a regulation of the transmission power of the desired signal.

10 Claims, 3 Drawing Sheets

POWER CONTROL IN A RADIO SYSTEM

This application is a continuation of PCT/FI99/00763 filed Sep. 16, 1999.

FIELD OF THE INVENTION

The invention concerns power regulation in a radio system, such as a cellular radio system, in connection with radio links or in an ad-hoc network.

TECHNICAL BACKGROUND

In a mobile communications system, regulation of the transmission power is performed in the mobile station MS and/or at the base transceiver station BTS in order to lower the network's interference level and to compensate for fading on the radio path. Usually, the objective of power regulation is constantly to preserve the received signal almost at the same power level, which is as low as possible, however, in such a way that the quality of the received signal will not suffer. When the level and/or quality of the signal in the radio communication between the mobile communications network and the mobile station drops below the desired level, regulation of the transmission power may be carried out at the base transceiver station and/or in the mobile station MS in order to improve the radio communication. The transmission power of the mobile station MS is usually regulated from the fixed network with the aid of a special power regulation algorithm.

FIG. 1 in the appended drawing shows a simplified block diagram of the GSM system (Global System for Mobile communications). The mobile station MS is connected over the radio path with some base transceiver station BTS, which is base transceiver station BTS1 in the case shown in FIG. 1. The Base Station Sub-system BSS includes a Base Station Controller BSC and subordinated base transceiver stations BTS. Usually, there are several base station controllers BSC subordinated to a Mobile Services Switching Centre MSC. The mobile services switching centre MSC is connected to other mobile services switching centres, and through a Gateway Mobile Services Switching Centre GMSC the GSM network is connected with other networks, such as a public switched telephone network PSTN, another public land mobile network PLMN or an ISDN network. The operation of the whole system is monitored by an Operation and Maintenance Centre OMC.

The mobile station MS measures the reception level (field strength) and quality of the downlink signal received from the base transceiver station BTS1 of the serving cell, while the base transceiver station BTS1 of the serving cell for its part measures the reception level (field strength) and quality of the uplink signal received from the mobile station MS. Based on these measurement results and on the established power regulation parameters, the power regulation algorithm determines a suitable transmission power level at the base transceiver station and/or in the mobile station. The transmission power level determined for the mobile station is made known to the mobile station MS in a power regulation instruction. Power regulation is carried out constantly during a call, e.g. in a GSM system of the TDMA type typically twice a second, and in a UMTS-WCDMA system (Universal Mobile Telecommunication System—Wide band CDMA) of the CDMA type 1600 times a second.

A known power regulation algorithm is C-based power control, wherein the determination of the transmission power is based on the power level C received from the radio communication. In this algorithm, the transmission power is the same for such radio communications which have the same attenuation over the radio path. FIG. 2 shows such a situation as an example, where mobile stations MS1 and MS2 in radio communication with a base transceiver station BTS1 are located at an equal distance attenuation from this serving base transceiver station. In the situation shown in FIG. 2, the signal is transmitted to the mobile stations from the serving base transceiver station BTS1 at equal transmission powers, although they are located in interference fields of different magnitudes, because mobile station MS1 receives more interference than mobile station MS2 from base transceiver station BTS2, which is operating at the same frequency. Thus, the problem with C power regulation is the inefficiency of the power regulation as regards co-channel interference.

Another known power regulation algorithm is C-based power control, wherein the transmission power determination is based on the quality of the signal received from the radio communication, which is measured from the received useful signal. Since the quality of the useful signal is also affected by the interference level of the reception, besides being affected by the received power level, the transmission from base transceiver station BTS1 in the situation shown as an example in FIG. 2 is at a higher transmission power to mobile station MS1 than to mobile station MS2. Hereby, the downlink transmission power is used to compensate for the co-channel interference received by the mobile station from other base transceiver stations. However, the high variation of interference is a problem with C/I power regulation, because C/I power regulation reacts to changes in the interference level with a delay, due to a delay in the signalling of measurement results, among other things. A high variation of interference will have the time to lower before the power regulation is able to compensate for the increase in interference, and also to increase to disturb the radio communication just when the power regulation has time to react to the low interference by reducing the transmission power. Such a variation of interference occurs e.g. in connection with techniques which make interference occur at random, such as frequency hopping and dynamic channel allocation, and/or in connection with packet data transmission.

Thus, the problem with the above-mentioned power regulation algorithms is the interference signals transmitted at the same frequency as the radio communication, especially in connection with co-channel interference occurring with a variation of interference.

BRIEF SUMMARY OF THE INVENTION

It is the purpose of this invention to bring about an efficient power regulation method, especially in an environment where variation of interference occurs.

This objective is achieved with a method in accordance with the invention, which is characterised by that which is said in the independent claims. Special embodiments of the invention are presented in the dependent claims.

The invention is based on the idea that the power regulation decision uses the measurement results of co-channel adjacent transmitter signals, besides the measurement results of the radio communication to be relayed. From the measurement results of the adjacent transmitter signals transmitted at the same frequency and in the same time slot as the monitored radio communication, an estimate is determined of that interference caused to the radio communication which is to be compensated for by regulating the transmission power of the desired signal. The estimate of the interference caused to the radio communication is preferably based on the geographical location of the interference source and on the long-term behavior of the interference power. Hereby the power regulation will react to the average interference value only, not to any individual instantaneous interference value. Thus, in a cellular radio network the power regulation is based on the network's cell isolation seen from the mobile station's view-point, that is, on the radio-technical degree of isolation of co-channel cells.

It is an advantage of the power regulation in accordance with the invention that it is efficient and stable in an environment with variable interference and especially in the radio network of irregular cells and/or in a cellular radio network, wherein there, are short frequency reuse distances. The power regulation in accordance with the invention is especially advantageous in a high variance interference field, e.g. when using techniques causing random interference, e.g. frequency hopping, and in packet form transmission.

It is another advantage of the power regulation in accordance with the invention that it does not require any additional traffic or signalling on the transmission path, especially in regard to C/I power regulation.

In addition, it is an advantage of the power regulation in accordance with the invention that it achieves a better C/I distribution in the network than what is achieved with known power regulation techniques.

LIST OF FIGURES

The invention will now be described more closely in connection with advantageous embodiments and referring to the examples shown in FIGS. 3–6 in the appended drawings, wherein.

DETAILED DESCRIPTION OF THE INVENTION

Figure 1:
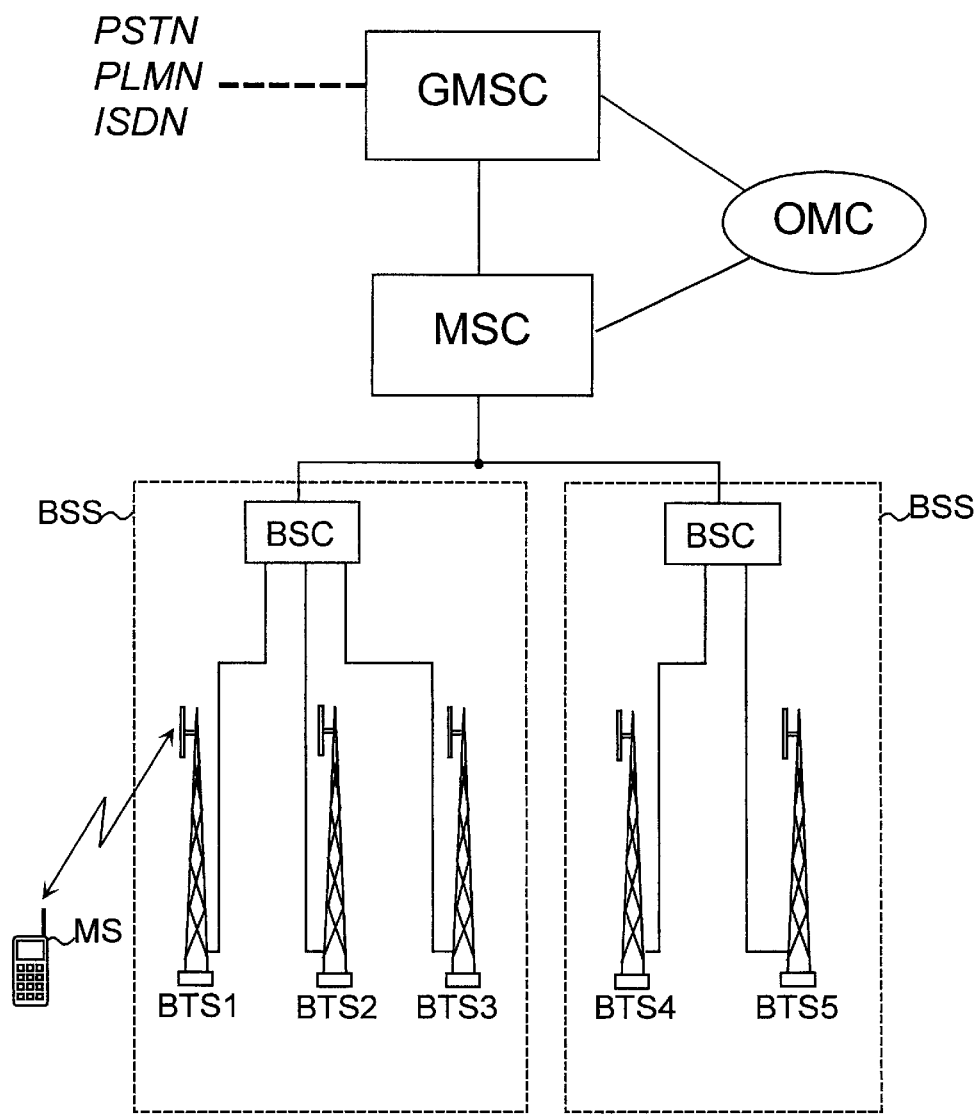
FIG. 1 shows those parts of a mobile communications network which are essential to the invention.
Figure 2:
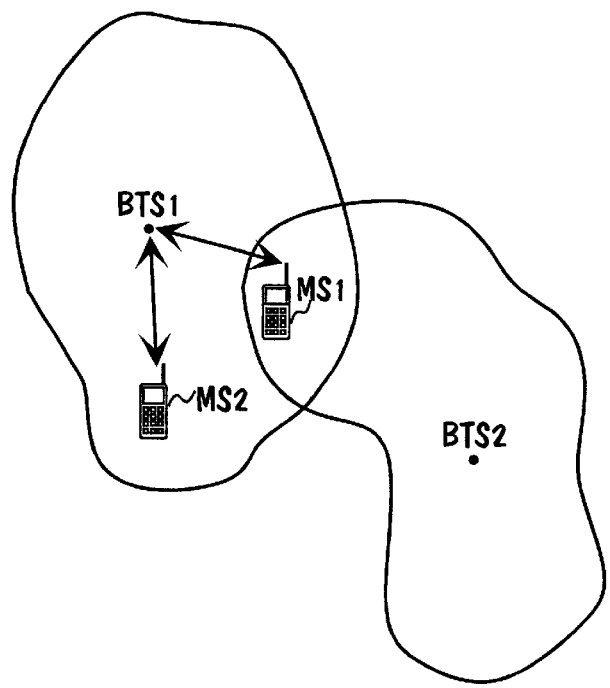
FIG. 2 shows a situation in a cellular network by way of example.

The present invention can be applied in connection with any radio system. In the following, the invention is described more closely by way of examples and primarily in connection with a digital GSM mobile communications system. FIG. 1 shows the structure of a simplified GSM network as described in the foregoing. Those who are interested will find background information as regards more detailed descriptions of the GSM system from GSM recommendations and from the book "The GSM System for Mobile Communications", M. Mouly & M. Pautet, Palaiseau, France, 1992, ISBN:2-9507190-0-7.

In the following, the invention is described in greater detail in the light of a first embodiment of the invention and referring to FIG. 3.

Figure 3:
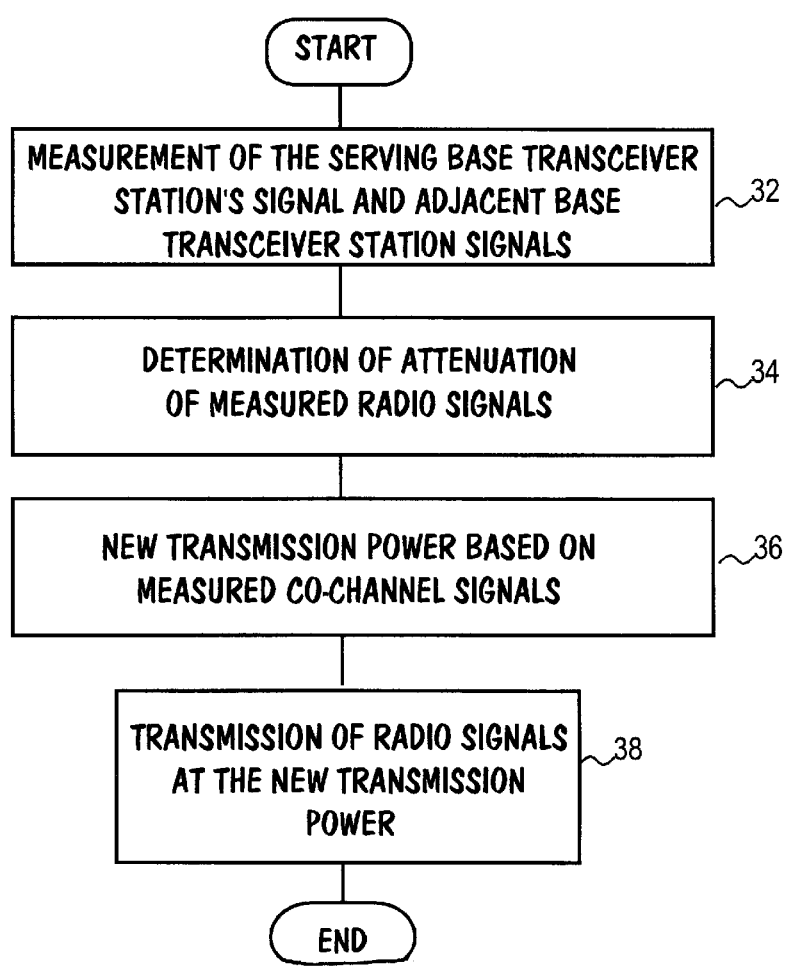
FIG. 3 is a flow chart of the first embodiment of the method according to the invention.

FIG. 3 is a flow chart in the downlink direction of a radio communication of a first embodiment of the power regulation in accordance with the invention. At point 32, state-of-the-art measurements are performed of the signal level and possibly of the signal quality of the radio communication as well as adjacent base transceiver station measurements. The measurement results are transmitted in a state-of-the-art fashion in a report message from the mobile station to the serving base transceiver station, e.g. in case of a possible exchange of channel, so no special signalling is required for the power regulation method of the invention as regards the measurement results. In accordance with the invention, the channel amplification of the useful signal and of interfering co-channel radio signals, that is, the propagation attenuation on the radio path, is determined at point 34 from the measurement results. At point 36, a new transmission power is determined with the aid of channel amplifications obtained from the measurement results, e.g. from some of the calculation algorithms to be presented hereinafter. The transmission of the radio signal is continued from the serving base transceiver station at this new determined transmission power (point 38).

The power regulation according to the invention is especially suitable for use when close to the reception point there are at least two transmitters transmitting at the same radio frequency/on the same radio channel. In particular, the invention is suitable for use in a mobile communications system for regulating the transmission power in the downlink direction. Hereby the regulation of the transmission power of the base transceiver station is based on the results of measurements in the mobile station of the desired signal and on the results of measurements of interfering base transceiver station signals. When the mobile station is located close to two base transceiver stations transmitting at the same time and at the same frequency, the signal of the adjacent base transceiver station will probably interfere with the mobile station's radio communication, irrespective of how far the mobile station is located from the serving base transceiver station. With the power regulation algorithm a new transmission power is determined for the concerned radio communication from the serving base transceiver station. The determination is preferably performed at the serving base transceiver station. The new transmission power may be determined e.g. in accordance with the following formula:

$$P_{tx} = \frac{\left(\sum_{i=1}^{M} G_i P_{mean,i}\right)^\alpha + SN}{G_{own}} \quad (1)$$

wherein $G_i$ is the channel amplification experienced by the individual interfering co-channel base transceiver station signal on the radio path, $P_{mean,i}$ is the long-term estimate of each individual interfering co-channel base transceiver station for the transmission power, e.g. the average transmission power, in the time slot of the radio communication, $\alpha$ is the optimising parameter, S is the signal-to-noise ratio required of the desired radio communication in reception, N is the noise power and $G_{own}$ is the channel amplification experienced by the desired signal, that is, the serving radio communication, on the radio path. The sum term $\Sigma$ is used for calculating the total interference caused by individual adjacent base transceiver station signals causing co-channel interference, whereby the base transceiver station index i is between one and M. In formula 1, the magnitudes are presented in linear units, but the same formula may of course be presented also with logarithm magnitudes.

Channel amplifications $G_i$ and $G_{own}$ are actually propagation losses of the radio signal, and as a coefficient they are thus less than one. Channel amplification $G_i$ is determined from the measurement results $C_i$ of the adjacent base transceiver station signals supplied by the mobile station to the network by calculating $G_i = C_i/P_{l\"ah}$, when the network contains information about the real transmission powers $P_{l\"ah}$ of adjacent base transceiver stations. Naturally, the channel amplification $G_i$ is not determined during pauses in the transmission. Correspondingly, the channel amplification $G_{own}$ experienced by the useful signal is obtained from the measurement results $P_{vast}$ of the radio communication supplied by the mobile station to the network by calculating e.g. $G_{own} = P_{vast}/P_{l\"ah}$.

The estimate $P_{mean,i}$ of the interfering transmission power is obtained e.g. by calculating from the measurement results of the measurement report or from the real transmission powers of each base transceiver station. $P_{mean,i}$ may also be determined from the real traffic in the network, whereby the interfering transmission power may even be foretold, since the base station controller knows the following transmission power of the base transceiver stations. If it is desirable to ensure a sufficient power regulation, the maximum power may be used as the interfering transmission power estimate, that is, $P_{mean,i} = P_{max,i}$. Hereby $P_{mean,i}$ may also be replaced by some other constant, if required, or by some other such value instead of the mean, which is determined from the transmission powers. The $P_{mean,i}$ value may be signalled in the network to those network elements which need this information.

The optimising parameter a may be used for optimising the transmission power value obtained with the calculation algorithm. This parameter can be set at any suitable value, e.g. the operator may set this parameter at a value which has been found to be good by experiments.

The signal-to-noise ratio S is determined from the signal-to-noise ratio needed by the mobile station and/or according to the service. The network operator usually sets this value. Noise power N is a standard parameter established in the network. The term SN may be disregarded when calculating the new transmission power, when the minimum power is sufficient, e.g. indoors.

To the sum $\Sigma$ are added the interfering base transceiver stations, preferably in an order of interference so that the one which interferes the most is calculated first and the one which interferes least is added last. Hereby, at a value of M=1 for the top limit of the sum, the interference concerned is the only interference or a dominating interference, and no other interference need then be taken into account in the calculation.

If the mobile communications system uses interference elimination in order to eliminate the strongest interfering signal entirely or partly from the received signal, a new transmission power can be determined using an algorithm in accordance with formula 2.

$$P_{tx} = \frac{\left(\sum_{i=1}^{M} G_i(r_i P_{mean,i})\right)^\alpha + SN}{G_{own}}; \quad (2)$$

$$r_i = \begin{cases} f\left(\frac{I_{dom}}{I_{others}}\right); & \text{if } G_i = \max(G) \\ 1; & \text{otherwise} \end{cases}$$

wherein, besides the magnitudes occurring in formula 1, $r_i$ is a coefficient obtaining a value of one for other base transceiver stations than the one causing the greatest interference, the signal of which is thus eliminated in the interference elimination, and $f(I_{dom}/I_{others})$ is a constant within a range of 0–1. Hereby, owing to the interference elimination e.g. carried out by the mobile station, the adjacent base transceiver station signal which interferes the most can be left entirely out of the calculations in the power regulation algorithm or it may be taken into account with less weight than for the others.

In the sum term of the power regulation algorithms presented above, all measured co-channel interference may be included or only a set of the measured co-channel interference may be included. The $P_{tx}$ determined by using the formulas presented above will increase when the value of the interference term increases and it will decrease when the value of the interference term decreases. Hereby the serving base transceiver station's transmission power is high for a mobile station located in a field of high average interference.

Using the method according to the invention it is also possible in the network to regulate the transmission power of several base transceiver stations to be suitable for each radio communication, so that any interference caused by others is compensated for by a new transmission power. The following is an example of a regulation algorithm in the power regulation of three base transceiver stations in accordance with the invention:

$$\begin{cases} P_{tx1} = \dfrac{\left(\sum_{i=2}^{3} G_i P_{tx,i}\right)^\alpha + SN}{G_1} \\ P_{tx2} = \dfrac{\left(\sum_{i=1,3} G_i P_{tx,i}\right)^\alpha + SN}{G_2} \\ P_{tx3} = \dfrac{\left(\sum_{i=1}^{2} G_i P_{tx,i}\right)^\alpha + SN}{G_3} \end{cases} \quad (3)$$

wherein in the sub-index of channel amplifications G and powers P, a number indicates the base transceiver station to which the magnitude is related. Channel amplifications $G_i$ are determined in relation to the concerned radio communication based on the measurement results of the mobile station. From formula 3 new transmission powers $P_{tx1}$, $P_{tx2}$ and $P_{tx3}$ are solved from the group of equations on the condition that no one of these is less than the minimum power or in excess of the maximum power.

For the calculation algorithms presented above, the determination of channel amplification $G_i$ is done either on the network side, e.g. at the base transceiver station or in the base station controller, or in the mobile station, to which the real transmission power information has been supplied from the network. If determination of the new transmission power is done in mobile station MS, the mobile station will transmit to the network a power regulation instruction as a result of the calculation for regulating the transmission power in the downlink direction. With the aid of channel amplification, an interfering co-channel adjacent base transceiver station signal can be taken efficiently into account in the power regulation, in spite of the variable character of the interference, because channel amplification is a magnitude which is more stable than the interference and it will remain essentially the same when the mobile station is moving only slightly.

Figure 4:
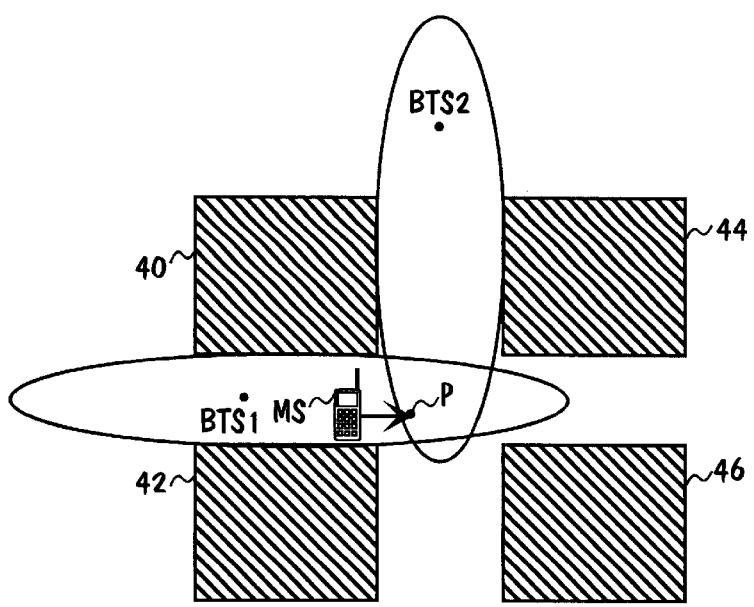
FIG. 4 shows another situation in a cellular network by way of example.

FIG. 4 shows by way of example another situation in a cellular network, where the coverage areas of co-channel base transceiver stations BTS1 and BTS2 cross each other in the crossing area of buildings 40–46. When mobile station MS is in radio communication with base transceiver station BTS1, e.g. in the form of a call or a data transmission, and MS is at the same time moving in the direction shown by the arrow in the figure, the mobile station will enter the coverage area of base transceiver station BTS2 for a short time beginning from point P indicated in the figure. With the aid of power regulation in accordance with the invention, the interference situation formed in the example shown by the figure can be quickly compensated for in a manner which is more efficient than with known power regulation methods, especially so when the interfering co-channel transmission of base transceiver station BTS2 is in packet form or otherwise of a variable level.

Figure 5:
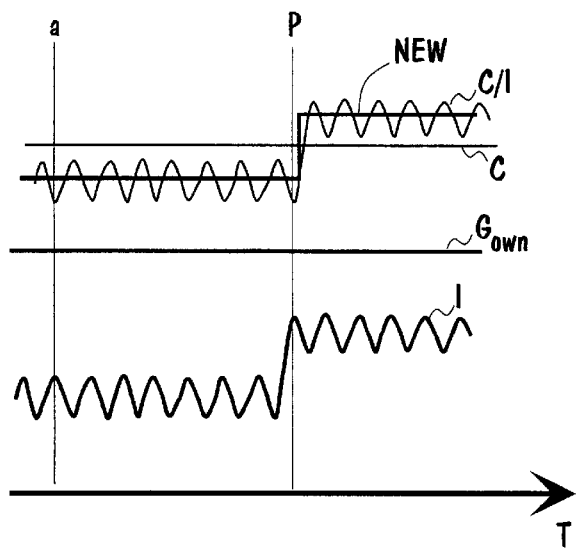
FIG. 5 shows known power regulations and the power regulation in accordance with the invention in the situation shown as an example in FIG. 4.

For the sake of comparison, FIG. 5 shows the effect of different power regulation methods in the situation shown in FIG. 4. The bottom curve in the figure shows the co-channel interference level I experienced by the mobile station, while the horizontal line $G_{own}$ shows how the channel amplification of the radio communication reduces in relation to the distance. Thus, in order to make the presentation clearer, the $G_{own}$ level is shown as standard, even though according to the example shown in FIG. 4 it is evenly declining as the mobile station is moving radially away from base transceiver station BTS1.

In FIG. 5, the effect of the known C power regulation on the transmission power of base transceiver station BTS1 is shown by a horizontal line C. Thus, the C power regulation does not in any way take into account the increased interference level emerging at point P marked by a vertical line in FIG. 5. In fact, a relatively large interference margin must be used in C power regulation.

Curve C/I indicates the reaction of the known C/I power regulation to changes in the interference level. The transmission power of base transceiver station BTS1 is hereby constantly regulated with a slight delay in relation to changes in the interference level, as can be seen e.g. from the point of the auxiliary line a drawn in the figure. The transmission power is regulated continuously to take into account all changes in the interference level, so the C/I curve will follow the interference level curve I.

The effect of power regulation according to the invention on the transmission power of base transceiver station BTS1 is illustrated by a curve marked by the word NEW in the figure. Hereby the transmission power of the base transceiver station will remain essentially standard in spite of slight variations in the interference level and it will react quickly to any increase of the mean value of the interference after point P.

Figure 6:
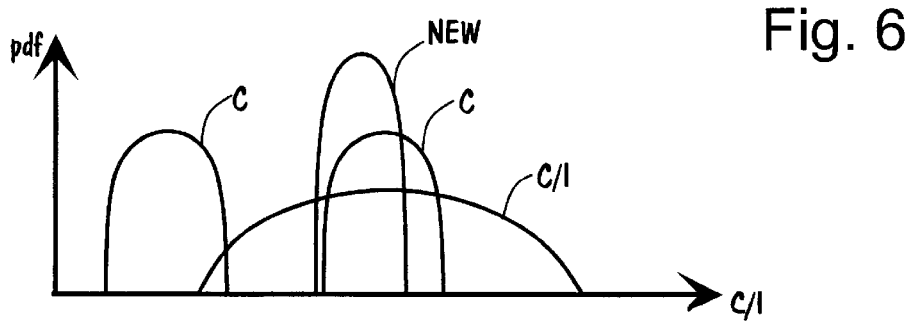
FIG. 6 shows as a comparison by way of example the C/I distributions of known power regulations and of the power regulation according to the invention.

FIG. 6 further shows C/I distributions of the above-mentioned power regulation methods in the situation shown as an example in FIG. 4, when the mobile station experiences an unexpected increase in the interference and the interfering transmission is in packet form. The distributions of different power regulation methods are again marked with references C, C/I and NEW respectively in FIG. 6. It can be seen in the figure that the power regulation in accordance with the invention provides the narrowest and thus the best C/I distribution.

The explanation given above is mainly a description of regulation of the transmission power of a base transceiver station in a cellular radio system. The method in accordance with the invention is also suitable for power regulation of a radio communication between a transmitter-receiver pair in other radio systems. Hereby the base transceiver station presented above generally means a transmitter while the mobile station means a receiver, whereby in accordance with the invention the transmitter's transmission power is regulated on a basis of results of measurements of the signals of the radio communication and of adjacent transmitter signals performed by the receiver. In such radio systems, where the receiver due to some other functionality does not supply measurement results to the transmitter, the measurement results are supplied from receiver to transmitter when required in connection with the power regulation method according to the invention.

The drawings and the related explanation are only intended to illustrate the inventive idea. As regards the details, the power regulation in accordance with the invention may vary within the scope defined by the claims. Although the invention has been explained above mainly in connection with a GSM system, the method may be used also in other radio systems, e.g. in a GSM EDGE system, which is the GSM system of the future with modulation adaptation, in a WLAN system (Wireless Local Area Network) and in a CDMA system on a common channel before the initial power regulation is found out, especially in a WCDMA system (Wide band Code Division Multiple Access). In a CDMA system, the power regulation in accordance with the invention has the advantage over a SIR based power regulation that no SIR estimate need to be requested from the mobile station before the transmission of each data burst, so the user data rate increases, and the interference estimation of the method according to the invention is more precise than the individual SIR estimate when the interference level varies greatly. The determination of the new transmission power according to the invention may be carried out also with the aid of other calculation algorithms than those presented above at the base transceiver station/in the transmitter and/or in the mobile station/ in the receiver. In the present application, radio systems also mean radio links and ad-hoc networks.

What is claimed is:

1. A method of power regulation in a radio system, the system including at least two transmitters transmitting at the same frequency and at least one receiver having set up a radio connection with a first of the transmitters, the method comprising:

at the receiver, performing measurements of the signal of the radio connection, and of signals which are co-channel signals with respect to the radio connection and which originate from transmitters other than said first transmitter;

determining attenuation of the radio path of at least one of the co-channel signals; and at the first transmitter, regulating the transmission power of the radio connection based on the results of the measurements of the radio connection signal and co-channel signals, including the determined attenuation.

2. The method as defined in claim 1, wherein the total interference caused by co-channels is calculated by determining radio path attenuation and a long-term transmission power estimate for each co-channel signal, and the transmission power is regulated based on the signal of the radio connection and on the calculated total interference.

3. The method as defined in claim 2, wherein the total interference caused by co-channels is calculated in the base station controller.

4. The method as defined in claim 3, wherein the power regulation requirement of several radio connections is determined in the base station controller, so that the new transmission power of each radio connection is determined taking into account the new transmission power of the other connections.

5. The method as defined in claim 1, wherein the transmission power of the transmitter is increased when the interference caused by co-channel signals is great, and the transmitter's transmission power is reduced, when the interference caused by co-channel signals is small.

6. The method as defined in claim 1, wherein the measurement results are supplied from the receiver to the transmitter of the radio connection, and the attenuation of co-channel signals is determined in the transmitter of the radio connection.

7. The method as defined in claim 1, wherein the attenuation of co-channel signals is determined in the receiver, and the transmission power regulation information is supplied from the receiver to the transmitter of the radio connection.

8. The method as defined in claim 1, wherein frequency hopping is used in the radio connection.

9. The method as defined in claim 1, wherein the transmission in the radio connection is in packet form.

10. A power regulation method in a mobile communications system, the system including at least two base transceiver stations transmitting at the same frequency and at least one mobile station having set up a radio connection with a first of the base transceiver stations, the method comprising:

in the mobile station, performing measurements of the signal of the radio connection, and of signals which are co-channel signals with respect to the radio connection and which originate from a base transceiver station other than the first base transceiver station;

determining attenuation of the radio path of at least one of the co-channel signals; and at the first transceiver, regulating the transmission power of the radio connection based on the results of measurements of the radio connection signal and co-channel signals, including the determined attenuation.

* * * * *

UNITED STATES PATENT AND TRADEMARK OFFICE
CERTIFICATE OF CORRECTION

PATENT NO. : 6,574,485 B1  Page 1 of 1
DATED : June 3, 2003
INVENTOR(S) : Oscar Salonaho and Antti Lappeteläinen It is certified that error appears in the above-identified patent and that said Letters Patent is hereby corrected as shown below:

<u>Title page,</u>
Item [75], should read as follows:
-- Inventors:   Oscar Salonaho, Helsinki (FI);
                Antti Lappeteläinen, Espoo (FI) --

Signed and Sealed this

Seventeenth Day of February, 2004

JON W. DUDAS
*Acting Director of the United States Patent and Trademark Office*